(12) United States Patent
Eaton

(10) Patent No.: US 8,557,139 B2
(45) Date of Patent: Oct. 15, 2013

(54) REPLACEMENT PLASTICIZER SYSTEM FOR PHTHALATE-PLASTICIZED FORMULATIONS

(75) Inventor: Robert F. Eaton, Belle Mead, NJ (US)

(73) Assignee: Dow Global Technologies LLC, Midland, MI (US)

( * ) Notice: Subject to any disclaimer, the term of this patent is extended or adjusted under 35 U.S.C. 154(b) by 362 days.

(21) Appl. No.: 12/866,563

(22) PCT Filed: Feb. 12, 2009

(86) PCT No.: PCT/US2009/033935
§ 371 (c)(1),
(2), (4) Date: Aug. 6, 2010

(87) PCT Pub. No.: WO2009/102877
PCT Pub. Date: Aug. 20, 2009

(65) Prior Publication Data
US 2012/0085568 A1    Apr. 12, 2012

Related U.S. Application Data

(60) Provisional application No. 61/029,035, filed on Feb. 15, 2008.

(51) Int. Cl.
```
C09K 3/00      (2006.01)
C08K 5/1515    (2006.01)
C08L 9/02      (2006.01)
C08L 27/06     (2006.01)
C09D 127/06    (2006.01)
```
(52) U.S. Cl.
USPC ...... 252/182.28; 524/314; 524/317; 524/114; 524/284; 524/569; 530/232; 554/149; 554/170; 554/227

(58) Field of Classification Search
USPC .......... 524/114, 314, 317, 284, 569; 554/149, 554/170, 227; 530/232; 252/182.28
See application file for complete search history.

(56) References Cited

U.S. PATENT DOCUMENTS

| | | | |
|---|---|---|---|
| 2,397,592 A | 4/1946 | Blades | |
| 2,403,215 A | 7/1946 | Foster | |
| 2,458,484 A | 1/1949 | Terry et al. | |
| 2,500,918 A | 3/1950 | Rueter et al. | |
| 2,618,622 A | 11/1952 | Grummit et al. | |
| 2,666,752 A | 1/1954 | Grummit et al. | |
| 3,138,566 A | 6/1964 | Arnold | |
| 3,281,382 A * | 10/1966 | Kuester et al. | 524/114 |
| 3,409,580 A | 11/1968 | Alzner | |
| 3,639,318 A * | 2/1972 | Tijunelis et al. | 524/114 |
| 3,668,091 A | 6/1972 | French et al. | |
| 3,712,875 A * | 1/1973 | Tijunelis | 524/110 |
| 3,778,465 A | 12/1973 | Barnstorf | |
| 3,780,140 A | 12/1973 | Hammer | |
| 3,868,341 A | 2/1975 | Sauer et al. | |
| 3,872,187 A | 3/1975 | Fath | |
| 3,891,694 A | 6/1975 | Mills et al. | |
| 4,083,816 A | 4/1978 | Frankel et al. | |
| 4,346,145 A | 8/1982 | Choi et al. | |
| 4,421,886 A | 12/1983 | Worschech et al. | |
| 4,426,477 A | 1/1984 | Yasumatsu et al. | |
| 4,556,694 A | 12/1985 | Wallace | |
| 4,605,694 A | 8/1986 | Walker | |
| 4,612,192 A | 9/1986 | Scheuffgen et al. | |
| 4,613,533 A | 9/1986 | Loomis et al. | |
| 4,627,993 A | 12/1986 | Loomis | |
| 4,670,494 A | 6/1987 | Semenza, Jr. | |
| 4,857,600 A | 8/1989 | Gross et al. | |
| 5,225,108 A | 7/1993 | Bae et al. | |
| 5,227,417 A | 7/1993 | Kroushl, III | |
| 5,246,783 A | 9/1993 | Spenadel et al. | |
| 5,270,366 A | 12/1993 | Hein | |
| 5,278,236 A | 1/1994 | Case et al. | |
| 5,430,108 A | 7/1995 | Schlosberg et al. | |
| 5,454,806 A | 10/1995 | Shinonome | |
| 5,464,903 A | 11/1995 | Hofmann | |
| 5,466,267 A | 11/1995 | Baillargeon et al. | |
| 5,575,965 A | 11/1996 | Caronia et al. | |
| 5,736,605 A | 4/1998 | Oshima | |
| 5,756,570 A | 5/1998 | Hoch et al. | |
| 5,886,072 A | 3/1999 | Linsky et al. | |
| 6,063,846 A | 5/2000 | Weng et al. | |
| 6,114,425 A | 9/2000 | Day et al. | |
| 6,274,750 B1 | 8/2001 | Sato et al. | |
| 6,417,260 B1 | 7/2002 | Weng et al. | |

(Continued)

FOREIGN PATENT DOCUMENTS

| CA | 1188445 A1 | 6/1985 |
|---|---|---|
| CN | 1341681 A | 3/2002 |

(Continued)

OTHER PUBLICATIONS

Gan, L.H., et al (1994). Epoxidized esters of palm olein as plasticizers for poly(vinyl chloride). *European Polymer Journal*, 31(8), 7i9-724.
Greenspan, F.P., el al (1953). Epoxy fatty acid ester plasticizers. *Industrial and Engineering Chemistry*, 45(12), 2722-2726.
Bizzari, S.N., et al (2003). Plasticizers. *C E H Marketing Research Report*, 38-64, Retrieved from http://www.sriconsulting.com.
Greenspan, F.P., et al (1956). Epoxy fatty acid ester plasticizers. Preparation and properties. The Journal of the American Oil Chemists' Society, 33, 391-394.
Gan, L.H., et al (1994). Epoxidized esters of palm olein as plasticizers for poly(vinyl chloride). European Polymer Journal, 31(8), 719-724.
Greenspan, F.P., et al (1953). Epoxy fatty acid ester plasticizers. Industrial and Engineering Chemistry, 45(12), 2722-2726.

(Continued)

Primary Examiner — Joseph D Anthony

(57) ABSTRACT

The present invention is a replacement plasticizer system made from or containing an epoxidized fatty acid ester plasticizer as a primary plasticizer and a secondary plasticizer. The replacement placement system is useful with a variety of polymers in applications such as wire-and-cable insulations, wire-and-cable jackets, coatings, adhesives, and castings.

7 Claims, No Drawings

(56) References Cited

U.S. PATENT DOCUMENTS

| | | |
|---|---|---|
| 6,437,170 B1 | 8/2002 | Thil et al. |
| 6,451,958 B1 | 9/2002 | Fan et al. |
| 6,495,033 B1 | 12/2002 | Talboom |
| 6,496,629 B2 | 12/2002 | Ma et al. |
| 6,608,142 B1 | 8/2003 | Weng et al. |
| 6,706,815 B2 | 3/2004 | Marchand et al. |
| 6,714,707 B2 | 3/2004 | Rossi et al. |
| 6,734,241 B1 | 5/2004 | Nielsen et al. |
| 6,797,753 B2 | 9/2004 | Benecke et al. |
| 6,849,694 B2 | 2/2005 | Hata |
| 6,949,597 B2 | 9/2005 | Nielsen et al. |
| 7,700,675 B2 | 4/2010 | Bueno de Almeida et al. |
| 2002/0013396 A1 | 1/2002 | Benecke et al. |
| 2004/0122159 A1 | 6/2004 | Mhetar et al. |
| 2005/0090590 A1 | 4/2005 | Nielsen et al. |
| 2005/0203230 A1 | 9/2005 | Kadakia et al. |
| 2006/0025544 A1 | 2/2006 | Koube et al. |
| 2006/0276575 A1 | 12/2006 | Hamaguchi et al. |
| 2007/0100049 A1 | 5/2007 | Ishizuka |
| 2007/0135562 A1 | 6/2007 | Freese et al. |
| 2008/0200595 A1 | 8/2008 | Hinault et al. |
| 2008/0227993 A1 | 9/2008 | Zuckerman |
| 2009/0149585 A1 | 6/2009 | De Quadros, Jr. et al. |
| 2009/0149586 A1 | 6/2009 | De Quadros, Jr. et al. |
| 2009/0312478 A1 | 12/2009 | Hasegawa et al. |
| 2010/0010127 A1 | 1/2010 | Barki et al. |
| 2010/0256278 A1 | 10/2010 | Harada et al. |
| 2011/0076502 A1 | 3/2011 | Chaudhary et al. |
| 2011/0272174 A1 | 11/2011 | Chaudhary |
| 2013/0005937 A1 | 1/2013 | Cramail et al. |

FOREIGN PATENT DOCUMENTS

| | | |
|---|---|---|
| CN | 10107510 A | 11/2007 |
| CN | 101108982 A | 1/2008 |
| CN | 101108982 A | 1/2008 |
| CN | 101591588 A | 12/2009 |
| CN | 101824193 A | 9/2010 |
| CN | 101914219 A | 12/2010 |
| EP | 0192961 A1 | 9/1986 |
| EP | 0358179 A2 | 3/1990 |
| EP | 0364717 A1 | 4/1990 |
| EP | 0 393 813 A1 | 10/1990 |
| EP | 0473915 A1 | 3/1992 |
| EP | 0565984 A1 | 10/1993 |
| EP | 0986606 A1 | 3/2000 |
| EP | 1218443 A1 | 7/2002 |
| EP | 1361039 A1 | 11/2003 |
| EP | 1624014 A1 | 2/2006 |
| EP | 2070977 A2 | 6/2009 |
| FR | 1437722 A | 5/1966 |
| GB | 499931 A | 1/1939 |
| GB | 790314 A | 2/1958 |
| GB | 910543 A | 11/1962 |
| GB | 934689 A | 8/1963 |
| GB | 1022920 A | 3/1966 |
| GB | 1102506 A | 2/1968 |
| GB | 1341623 A | 12/1973 |
| GB | 2155021 A | 9/1985 |
| JP | S44-007131 | 3/1969 |
| JP | S61-016950 | 1/1986 |
| JP | 04-059851 B2 | 2/1992 |
| JP | H04-085354 | 3/1992 |
| JP | H04-261452 A | 9/1992 |
| JP | 2000-319468 A | 11/2000 |
| JP | 2003-064233 A | 3/2003 |
| JP | 2003-297149 A | 10/2003 |
| JP | 2004311064 A | 11/2004 |
| JP | 2010-042669 A | 2/2010 |
| WO | 9730115 A1 | 8/1997 |
| WO | 0114466 A1 | 3/2001 |
| WO | 01/98404 A2 | 12/2001 |
| WO | 2004/052977 A1 | 6/2004 |
| WO | 2007006489 A1 | 1/2007 |
| WO | WO-2007006489 A1 | 1/2007 |
| WO | 2008081330 A1 | 7/2008 |
| WO | 2008081332 A1 | 7/2008 |
| WO | 2008/122364 A1 | 10/2008 |
| WO | 2009/102877 A1 | 8/2009 |
| WO | 2011/041372 A1 | 4/2011 |
| WO | 2011/041380 A1 | 4/2011 |
| WO | 2011/041388 A1 | 4/2011 |
| WO | 2013003225 A2 | 1/2013 |

OTHER PUBLICATIONS

Bizzari, S.N., et al (2003). Plasticizers. CEH Marketing Research Report, 38-39,42,52. Retrieved from http://www.sriconsulting.com.
Barnicoat, C.R. 1945. Reactions and properties of annatto as a cheese colour. Part II. J. Dairy Res. 14: 59-63.
Campanella A. et al.; High Yield Epoxidation of Fatty Acid Methyl Esters with Performic Acid Generated In Situ; Chemical Engineering Journal, 144 (2008) 466-475 (Elsevier B.V.).
Chuanshang Cai, et al.; Studies on the Kinetics of In Situ Epoxidation of Vegetable Oils; Eur. J. Lipid Sci. Technol., 2008, 110, 341-346 (Wiley-VCH GmbH & Co. KGaA, Weinheim).
Corrigan, Brian, Oil purification, filtration and reclamation, Iron Age (1947) 159(14).
Du G., et al., Catalytic Epoxidation of Methyl Linoleate, JAOCS, vol. 81, No. 4 (2004).
Freedman, F., Butterfield, R., and Pryde, E.H. Transesterification Kinetics of Soybean Oil. JAOCS, 63(10) p. 1375 (1986).
Grummitt O. and Fleming H. Acetylated Castor Oil Industrial and Engineering Chemistry, vol. 37, No. 5, May 1945, pp. 485-491.
Haas, Michael J. Improving the Economics of biodiesel production through the use of low value lipids as feedstocks: vegetable oil soapstock, Fuel Processing Technology 86 p. 1087-96 (2005).
Jensen, R.G. Purification of Triglycerides with an Aluminca Column, Lipids, 451-452 (1966).
Morgenstern, B. "Epoxidized Fatty Acid Esters as Plasticizers for PVC" dated Apr. 22, 2005.
Morgenstern, B. Epoxidized Fatty Acid Esters as Plasticizers for PVC, presented at the 7th Freiberg Polymer Conference, Apr. 21 and 22, 2005.
Morgenstern, B. Use of Modified Fatty Acid Esters as Plasticizers for PVC, dated Sep. 12, 2003.
Opposition dated Jan. 9, 2013 EP2245089B1.
Orellana-Coca et al., Lipase Mediated Simultaneious Esterification and Epoxidation of Oleic Acid for the Production of Alkylepoxystearates. Journal of Molecular Catalysis B: Enzymatic 44 (2007) 133-137.
Stuart, A et al., Polym. Bull. (2010) 65:589-598.
Rehberg, C. et al. Plasticizers from Lactic Esters and Biabasic Acids Ind. Eng. Chem., 1952, 44 (9), pp. 2191-2195.
Santacesaria E. et al.; A Biphasic Model Describing Soybean Oil Epoxidation with H2O2 in a Fed-Batch Reactor; Chemical Engineering Journal, vol. 173, Issue 1, Sep. 1, 2011, pp. 198-209 (Elsevier B.V.).
Senžana S. et al.; Kinetics of In Situ Epoxidation of Soybean Oil in Bulk Catalyzed by Ion Exchange Resin; Journal of the American Oil Chemists' Society, vol. 78, No. 7 (2001) 725-731 (AOCS Press).
Sheehan, J et al. "A Look Back at the U.S. Department of Energy's Aquatic Species Program: Biodiesel from Algae", National Renewable Energy Laboratory, Colorado, Jul. 1998, pp. 1-294.
Taylor, D. R. Proceedings of the World Conference on oilseed technology and utilization, Adsorptive Purification, American Oil Chemists Society, Champaing, 1992, p. 152-165.
Tekin A., and Hammond E. Factors Affecting the Electrical Resistivity of Soybean Oil, JAOCS, vol. 75(6) 1998.
XP002657062 Vertellus Performance Materials Inc.; Flexricin P-8 Technical Data Sheet, Nov. 2006.
XP002669860, Thomson Scientific, Mar. 13, 2009, London, GB.
TCI America, Online Catalog: Tributyrin; http://web.archive.org/web/20080511154307/http://www.tciamerica.com/.
PCT/US2010/050654 International Search Report and Written Opinion.

(56) References Cited

OTHER PUBLICATIONS

PCT/US2010/050676 International Search Report and Written Opinion.
PCT/US2010/050690 International Preliminary Report on Patentability.
PCT/US2010/050690 International Search Report and Written Opinion.
PCT/US2010/050699 International Search Report and Written Opinion.
PCT/US2011/035143 International Search Report and Written Opinion.
PCT/US2011/041557 International Preliminary Report on Patentability.
PCT/US2011/041557 International Search Report and Written Opinion.
PCT/US2011/045653 International Search Report and Written Opinion.
PCT/US2012/043740 International Search Report and Written Opinion.
PCT/US2012/055070 International Search Report and Written Opinion.
PCT/US2013/023362 International Search Report and Written Opinion.
PCT/US2009/033935 Internations Preliminary Report of Patentability.
PCT/US2009/033935 International Search Report and Written Opinion.

* cited by examiner

REPLACEMENT PLASTICIZER SYSTEM FOR PHTHALATE-PLASTICIZED FORMULATIONS

The present invention generally relates to the field of polymers. Specifically, the present invention relates to plasticizers used in polymers to create desired physical characteristics in the resulting polymer/plasticizer complex, such as increasing flexibility, pliability, and plasticity in the resultant polymer complex, For example, plasticizers such as di(2-ethythexyl)phthalate ("DEHP"), di-isononyl phthalate ("DINP"), and other phthalate plasticizers have long been industry standard plasticizers used with polymers such as homo- and copolymers- of polyvinyl chloride ("PVC"), polyvinyl dichlorides ("PVDC"), vinyls, and similar polymers and resins to impart pliability and plasticity while retaining good tensile strength and resistance to cracking at low temperatures. For example, phthalate plasticizers have been used with rigid polymers such as PVC to create pliable materials used in such goods as intravenous (IV) bags and tubing, molded children's toys that require a soft or malleable feel, and various other applications where pliability or softness needs to be imparted to a polymer.

Phthalate plasticizers such as DEHP and DINP were once preferred plasticizers due to their ability to impart the physical characteristics noted above, and their permanence in the polymer over time, even when exposed to relatively high temperatures and humidity. However, public sentiment has prompted many manufacturers of consumer products to discontinue use of phthalates as a plasticizer due to concerns over potential adverse health effects, Thus, plasticizer compositions that reduce or eliminate phthalates, but perform similarly to DINP or other effective phthalate plasticizers, would be greatly appreciated in the art. Moreover, alternative non-phthalate plasticizers, which show an improved permanence in, and high compatibility with, a broad range of polymers would be greatly appreciated in the art.

Notable phthalate-free examples of plasticizers for use in PVC formulations include epoxidized soy oil. Unfortunately, epoxidized soy oil has limited solubility in PVC and insufficiently plasticizes PVC for many applications. Other epoxides have been identified as potential PVC plasticizers, including epoxies made from esters of fatty acids, the epoxy of 2-ethylhexyanol, and epoxidized palm oil esters. Unfortunately, epoxies made from esters of fatty acids such as the epoxidized methyl ester of soy oil are too volatile to serve as useful plasticizers of PVC.

Yet, the need exists for phthalate-free plasticizers that are compatible with other plasticizers, suitably nonvolatile, not petroleum-based, and capable of imparting thermal stability to formulations presently using phthalate plasticizers. It is further desirable to broaden the applications in which PVC, other halogenated polymers, acid-functionalized polymers, anhydride-functionalized polymers, and nitrile rubbers may be used by developing new plasticized formulations. In some instances, it might prove useful for the plasticizer or the plasticizer system to act as an acid scavenger.

To that end, the presently invented replacement plasticizer system is provided, comprising an epoxidized fatty acid ester plasticizer as a primary plasticizer and a secondary plasticizer. The replacement placement system is useful with a variety of polymers in applications such as wire-and-cable insulations, wire-and-cable jackets, coatings, adhesives, and castings.

Suitable epoxidized fatty acid ester plasticizers include epoxidized biodiesel and epoxidized derivatives of fatty acid esters of biodiesel. For the purposes of this application, the term "biodiesel" means herein mono-alkyl esters of long chain fatty acids derived from vegetable oils or animal fats. Preferably, the biodiesel is derived from vegetable oils.

Also, preferably, the epoxidized fatty acid ester is an epoxide of a fatty acid methyl ester. More generally, the epoxidized fatty acid ester can be any epoxidized fatty acid $C_1$-$C_{14}$ ester, including ethyl, propyl, butyl, and 2-ethylhexyl esters.

The epoxidized fatty acid ester can be prepared in a variety of conventional ways. For example, natural oils can be used as the starting material. In that instance, the natural oils can be saponified to the fatty acids and then esterified with alcohols. Next, the low molecular weight esters are epoxidized. The unsaturated ester can be epoxidized with a per-acid.

Alternatively, a glycidyl ester of the fatty acid can be prepared via epichlorohydrin or related chemicals. In yet another alternate, it is possible to transesterify the triglyceride with alcohols and then epoxidize the unsaturated fatty ester with a per-acid.

An example of preparing an epoxide of a fatty acid methyl ester begins with soy oil, wherein the soy oil is transesterified with methanol to make the methyl ester of the fatty acids in the oil. Glycerol is removed from the reaction products due to insolubility. A solution of per acetic acid in ethyl acetate is used to epoxidize the double bonds on the fatty acids. The per-acid is kept below 35% per acid and 35 degrees Celsius to prevent detonation. After completion, the ethyl acetate and product acetic acid are removed via vacuum stripping.

When formulated with the polymer, the primary plasticizer is present in an amount of from about 0.1 to about 60 parts per hundred rubber.

Suitable secondary plasticizers include any plasticizer having a vapor pressure lower than that of the epoxidized fatty acid ester. For example, when the epoxidized fatty acid ester is an epoxide of a fatty acid methyl ester, a suitable secondary plasticizer is preferably epoxidized soy oil. Secondary plasticizers include epoxidized soy oil, epoxidized linseed oil, and epoxides of other vegetable oils as well as conventional plasticizers such as petroleum-based phthalates, chlorinated hydrocarbons, trimelitates, and phosphate-based plasticizers. Notably, when flame retardancy is desirable, a phosphate plasticizer is suitable.

Preferably, the secondary plasticizer is not a phthalate. As such, preferably, the replacement placement system is phthalate-free.

When formulated with the polymer, the second plasticizer is present in an amount of from about 0.1 to about 60 parts per hundred rubber. Preferably, the primary and secondary plasticizers are present in a 1:1 ratio.

Suitable polymers for using the replacement plasticizer system of the present invention include halogenated polymers, acid-functionalized polymers, anhydride-functionalized polymers, and nitrile rubbers. Preferably, the polymer is a halogenated polymer. More preferably, the halogenated polymer is a PVC polymer selected from the group consisting of PVC homopolymers, PVC copolymers, polyvinyl dichlorides (PVDC), and polymers of vinylchloride with vinyl, acrylic and other co-monomers. Examples of other suitable halogenated polymers are chlorinated polyolefins and chlorinated rubbers.

Suitable acid-functionalized polymers include acrylic-acid functionalized polymers. Notably, the system is also useful with acrylic and other polymers that require plasticizers to reduce glass transitions or improve toughness.

The formulation may further comprise fillers, pigments, metal ion containing stabilizers, UV stabilizers, lubricants, metal soaps, oxides of stabilizers, additional plasticizers, and processing aids.

EXAMPLES

The following non-limiting examples illustrate the invention.

Example 1 and Comparative Example 2

A simplified PVC wire insulation formulation was produced with a primary and a secondary plasticizer. The PVC used was Oxychem 240F polyvinyl chloride homopolymer, having a K Value of 70. The calcium carbonate was obtained from Huber Materials. The dibutyl tin dilaurate (DBTDL) was obtained from Arkema. The epoxidized soy oil was obtained from Ferro Corp.

The comparative example was prepared using diisodecyl phthalate (DIDP), a conventional plasticizer, as the primary plasticizer and was obtained from VWR International. The example of the present invention was prepared with epoxidized biodiesel as the primary plasticizer.

The amount of each component is shown based on parts per hundred rubber (phr).

The target glass transition temperature (Tg) was 40-50 degrees Celsius.

TABLE 1

| Component | Example 1 | Comp. Ex. 2 |
|---|---|---|
| PVC | 100 | 100 |
| DIDP |  | 40 |
| epoxidized biodiesel | 28 |  |
| CaCO$_3$ | 10 | 10 |
| DBTDL | 4 | 4 |
| Epoxidized soy oil | 2 | 2 |
| Physical Properties | | |
| Tg | 42 degrees Celsius | 42 degrees Celsius |

Example 3 and Comparative Example 4

A simplified PVC electrical cable jacket formulation was produced. The PVC was Oxychem 240F polyvinyl chloride homopolymer, having a K Value of 70. The calcium carbonate was obtained from Huber Materials. A Zn/Ca stabilizer was obtained as MARK™ 6797 Zn/Ca stabilizer from Chemtura Corporation. The antioxidant was IRGANOX™ 1076 monofunctional hindered phenolic antioxidant available from Ciba Corporation. The epoxidized soy oil was obtained from Ferro Corp. The amount of each component is shown based on parts per hundred rubber (phr).

For the aging evaluation, the test specimen of each formulation was subjected to 100 degrees Celsius for 10 days. To achieve desired industry performance, a minimum of 65% retention of the initial elongation is required.

TABLE 2

| Component | Example 3 | Comp. Ex. 4 |
|---|---|---|
| PVC | 100 | 100 |
| epoxidized biodiesel | 27.5 | 55 |
| epoxidized soy oil | 27.5 |  |
| CaCO$_3$ | 68 | 68 |
| Zn/Ca stabilizer | 2.5 | 2.5 |
| Antioxidant | 0.05 | 0.05 |
| Physical Properties | | |
| Shore A | 85 | 75 |
| Strain at Break (initial) | 260% | 400% |
| Strain at Break (aged) | 180% | 200% |
| % Elongation Retained | 73% | 50% |

What is claimed is:

1. A plasticizer system composition comprising:
    (a) a primary plasticizer consisting of an epoxidized fatty acid ester plasticizer selected from the group consisting of epoxidized biodiesel, epoxidized derivatives of fatty acid esters of biodiesel and an epoxide of a fatty acid methyl ester, and
    (b) a secondary plasticizer selected from the group consisting of epoxidized soy oil, epoxidized linseed oil, and epoxides of other vegetable oils,
    wherein the system is phthalate free.

2. The plasticizer system composition of claim 1 wherein the biodiesel is derived from a vegetable oil.

3. A plasticized polymer composition comprising:
    (a) a polymer selected from the group consisting of halogenated polymers, acid-functionalized polymers, anhydride-functionalized polymers, and nitrile rubbers; and
    (b) a plasticizer system according to any of claims 1 or 2.

4. The plasticized polymer composition of claim 3 wherein the polymer is a polyvinyl chloride polymer (PVC) selected from the group consisting of PVC homopolymers, PVC copolymers, polyvinyl dichlorides (PVDC), and polymers of vinylchloride with vinyl, acrylic and other co-monomers.

5. A cable comprising one or more electrical conductors or a core of one or more electrical conductors, each conductor or core being surrounded by a layer comprising the plasticized polymer composition according to either of claims 3 or 4.

6. The plasticizer system composition of claim 1 wherein the secondary plasticizer is epoxidized soy oil.

7. The plasticizer system composition of claim 1 wherein the primary plasticizer and the secondary plasticizer are present in approximately a 1:1 weight ratio.

* * * * *